United States Patent
Kim et al.

(10) Patent No.: US 12,319,199 B2
(45) Date of Patent: Jun. 3, 2025

(54) LIGHTING DEVICE OF STEERING WHEEL AND ASSEMBLING METHOD THEREOF

(71) Applicants: Hyundai Motor Company, Seoul (KR); Kia Corporation, Seoul (KR); DH AUTOLEAD Co., Ltd., Jeonbuk-do (KR)

(72) Inventors: Soo Hee Kim, Seongnam-si (KR); Hyo Ryeol Sim, Hwaseong-si (KR); Jun Ho Bang, Yongin-si (KR); Eung Joo Kim, Suwon-si (KR); Seok Geun Lee, Gwangju (KR); In Taek Jeong, Hwaseong-si (KR); Yun Su Kim, Gwangju-si (KR); Jong Hyun Koo, Gwangju-si (KR)

(73) Assignees: HYUNDAI MOTOR COMPANY, Seoul (KR); KIA CORPORATION, Seoul (KR); DH AUTOLEAD CO., LTD, Jeonbuk-do (KR)

( * ) Notice: Subject to any disclaimer, the term of this patent is extended or adjusted under 35 U.S.C. 154(b) by 0 days.

(21) Appl. No.: 18/772,867

(22) Filed: Jul. 15, 2024

(65) Prior Publication Data
US 2024/0375581 A1 Nov. 14, 2024

Related U.S. Application Data

(62) Division of application No. 18/218,223, filed on Jul. 5, 2023, now Pat. No. 12,071,070.

(30) Foreign Application Priority Data

Dec. 13, 2022 (KR) .......................... 10-2022-0174014

(51) Int. Cl.
*B60Q 3/283* (2017.01)
*B60Q 3/60* (2017.01)

(52) U.S. Cl.
CPC ............... *B60Q 3/283* (2017.02); *B60Q 3/60* (2017.02)

(58) Field of Classification Search
CPC .......... B60Q 3/283; B60Q 3/60; B62D 1/046; B62D 1/04; B62D 1/06; B60K 35/60
See application file for complete search history.

(56) References Cited

U.S. PATENT DOCUMENTS

| | | |
|---|---|---|
| 11,198,387 B1 | 12/2021 | Matsu et al. |
| 11,242,080 B2 | 2/2022 | Gardner et al. |
| (Continued) | | |

FOREIGN PATENT DOCUMENTS

| | | |
|---|---|---|
| JP | 5216671 B2 | 6/2013 |
| WO | 2022/207343 A1 | 10/2022 |

*Primary Examiner* — Zheng Song
(74) *Attorney, Agent, or Firm* — Morgan, Lewis & Bockius LLP

(57) ABSTRACT

A lighting device of a steering wheel and an assembling method of the lighting device improving an assembly process and mass productivity of the lighting device by simplifying an assembly structure thereof, includes a grip body forming a rim of the steering wheel and including a body groove portion formed in a shape in which the body groove portion is cut away along the rim, a bezel fitted to the body groove portion and assembled to the grip body so that the body groove portion is covered by the bezel, the bezel including a center portion provided with a light transmission hole, and includes a light emitting body assembled to the bezel to overlap the light transmission hole from between the body groove portion and the bezel, the light emitting body being configured to emit light through the light transmission hole.

2 Claims, 13 Drawing Sheets

(56) References Cited

U.S. PATENT DOCUMENTS

| | | | |
|---|---|---|---|
| 2006/0236807 A1* | 10/2006 | Yasuda | B62D 1/06 74/552 |
| 2012/0006148 A1 | 1/2012 | Nagata | |
| 2014/0109719 A1* | 4/2014 | Lisseman | B62D 1/06 74/552 |
| 2016/0025281 A1 | 1/2016 | Gardner et al. | |
| 2017/0166117 A1* | 6/2017 | Nagata | F21V 29/85 |
| 2018/0043920 A1* | 2/2018 | Fujii | H05B 3/16 |
| 2018/0348392 A1* | 12/2018 | Nishio | B62D 1/046 |
| 2019/0351860 A1 | 11/2019 | Ohki et al. | |
| 2020/0001782 A1 | 1/2020 | Kamei et al. | |
| 2020/0156690 A1* | 5/2020 | Nonoyama | B62D 1/04 |
| 2021/0221285 A1* | 7/2021 | Kihara | B60K 35/60 |
| 2022/0306198 A1 | 9/2022 | Sakakibara | |
| 2022/0315090 A1* | 10/2022 | Kojima | B62D 1/06 |
| 2023/0322156 A1 | 10/2023 | Farrar | |

\* cited by examiner

CROSS-SECTION TAKEN ALONG LINE A-A

CROSS-SECTION TAKEN ALONG LINE B-B

CROSS-SECTION TAKEN ALONG LINE C-C

CROSS-SECTION TAKEN ALONG LINE D-D

CROSS-SECTION TAKEN ALONG LINE E-E

LIGHTING DEVICE OF STEERING WHEEL AND ASSEMBLING METHOD THEREOF

CROSS REFERENCE TO RELATED APPLICATION

This application is the divisional application of U.S. patent application Ser. No. 18/218,223 filed on Jul. 5, 2023, which claims priority to Korean Patent Application No. 10-2022-0174014, filed Dec. 13, 2022, the entire contents of which is incorporated herein for all purposes by this reference.

BACKGROUND OF THE PRESENT DISCLOSURE

Field of the Present Disclosure

The present disclosure relates to a lighting device of a steering wheel and an assembling method of the lighting device improving an assembly process and mass productivity of the lighting device by simplifying an assembly structure of the lighting device.

Description of Related Art

Visual and audible alarms are applied to a vehicle to enable communication between the vehicle and a driver.

An indicator based on a lighting device is mounted on a steering wheel of a driver's seat recently so that driving information of a vehicle linked to advanced driver assistance systems is transmitted to a driver, so that an aesthetic effect is also improved.

Meanwhile, to perform an indicator function by the lighting device, a light emitting body is required to be mounted on the steering wheel and the light emitting body is required to emit light, and also a structure in which the driver is capable of checking light of the light emitting body is required to be provided.

However, in a conventional lighting device, components to be mounted on the steering wheel are complicated, the number of the components is large, and an assembly process is complicated, so that the conventional lighting device has a problem in that mass productivity is reduced.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a lighting device of a steering wheel improving an assembly process and mass productivity of the lighting device by simplifying an assembly structure of the lighting device.

In various aspects of the present disclosure, according to an exemplary embodiment of the present disclosure, there is provided a lighting device of a steering wheel, the lighting device including: a grip body forming a rim of the steering wheel and including a body groove portion formed in a shape in which the body groove portion is cut away along the rim; a bezel fitted to the body groove portion and assembled to the grip body so that the body groove portion is covered by the bezel, the bezel having a center portion provided with a light transmission hole; and a light emitting body assembled to the bezel so that the light emitting body overlaps the light transmission hole from between the body groove portion and the bezel, the light emitting body being configured to emit light through the light transmission hole.

An assembly groove which forms a border of the light transmission hole and which has a shape corresponding to a shape of the light emitting body may be formed in a rear surface of the bezel, and the light emitting body may be fitted and assembled to the assembly groove.

An assembly guide protrusion and an assembly guide groove may be respectively formed in the assembly groove and the body groove portion that faces the assembly groove, the assembly guide protrusion may be fitted to the assembly guide groove, and a fastener may pass through and may be coupled to the assembly guide protrusion and the assembly guide groove, so that the bezel and the grip body may be coupled to each other.

The lighting device may include a wire electrically connected to the light emitting body, and a body wire groove may be formed in an external surface of the grip body, so that the wire may be inserted into the body wire groove.

The body wire groove may be formed so that the body wire groove is connected from a front surface of the body groove portion of the grip body to a rear surface of the body groove portion and is connected toward a spoke of the steering wheel from a rear surface of the grip body.

A bezel wire groove which is connected to the body wire groove may be formed in the rear surface of the bezel, so that the wire may be inserted into the bezel wire groove.

A wheel cover may be formed on the grip body so that the wheel cover covers the body wire groove.

The wheel cover may include: a pad layer covering the external surface of the grip body except for a portion to which the bezel is assembled; and a covering layer covering the pad layer and together with an external surface of the bezel except for a portion to which an external lens is assembled.

The lighting device may further include: an internal lens provided on a front surface of the bezel to overlap the light transmission hole; and an external lens having a shape covering the internal lens and being coupled to the bezel, bringing the internal lens into contact with the front surface of the bezel.

A contact surface forming a border of the light transmission hole and having a shape corresponding to a shape of the internal lens may be formed on the front surface of the bezel, and a protrusion lens portion having a shape corresponding to a shape of the light transmission hole may be formed on a rear surface of the internal lens, so that a border of the rear surface of the internal lens may be in contact with the contact surface while the protrusion lens portion is inserted into the light transmission hole.

A subhooking protrusion having an arrow shape may be formed on an internal wall of the light transmission hole, and a subhooking hole may be formed in a rear surface of the external lens, so that the subhooking protrusion may be caught in the subhooking hole.

A bezel interference avoiding groove may be formed in a portion of an internal surface of the light transmission hole and the subhooking protrusion may be formed in the bezel interference avoiding groove, a lens interference avoiding groove may be formed in a portion of an external surface of the internal lens in which the portion corresponds to the bezel interference avoiding groove, a subhook groove portion that protrudes toward the bezel may be formed on the rear surface of the external lens, and the subhooking protrusion may be caught in the subhooking hole while the subhook groove portion is inserted into the lens interference avoiding groove and the bezel interference avoiding groove since the subhooking hole is formed in the subhook groove portion.

A lens assembling groove having a shape corresponding to a shape of the external lens may be formed in the front surface of the bezel, a main hooking protrusion having an arrow shape may be formed in an internal wall of the lens assembling groove, and a main hooking hole may be formed in a rear surface of the external lens, so that the main hooking protrusion may be caught in the main hooking hole.

According to an exemplary embodiment of the present disclosure, there is provided an assembling method of a lighting device of a steering wheel, the assembling method including: a wire coupling process in which a wire is coupled to a light emitting body; a temporarily assembling process in which the light emitting body coupled to the wire is temporarily assembled to a rear surface of a bezel; an arranging process in which the wire is inserted and disposed into a body wire groove which is formed in a grip body; a bezel coupling process in which the bezel and the grip body are coupled to each other by use of a fastener; and a wheel cover forming process in which a wheel cover is formed on the grip body so that the wheel cover covers the body wire groove.

In the wheel cover forming process, after an external surface of the grip body is covered with a pad layer except for a portion to which the bezel is assembled, a covering layer may cover the pad layer and together with an external surface of the bezel except for a portion to which an external lens is assembled.

After the wheel cover forming process, the method may further include: an internal lens assembling process in which an internal lens is inserted into a light transmission hole formed in a front surface of the bezel; and an external lens assembling process in which an external lens is fastened to the bezel by use of a coupling structure of a hooking protrusion and a hooking hole that are formed in the external lens and the bezel.

According to an exemplary embodiment of the present disclosure, since the light transmission hole is formed in the bezel and the lighting device is constituted by assembling the light emitting body between the bezel and the grip body, there is an effect that an assembly process and mass productivity of an indicator based on the lighting device are improved by simplifying the assembly structure of the lighting device.

Furthermore, because the internal lens is assembled to the bezel at a same time when the external lens is assembled to the bezel, there is an effect that an assembly structure between components is further simplified.

Furthermore, because the wire is fixed to the grip body by inserting the wire into the body wire groove only, an assembly process of the wire is simplified, so that there is an advantage that an the ease of assembly of a product is improved.

Furthermore, because the grip body formed of a polyurethane material and the pad layer cover a portion of the grip body where the bezel is not assembled, there is an advantage that an excellent gripping sensation of the rim is realized.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
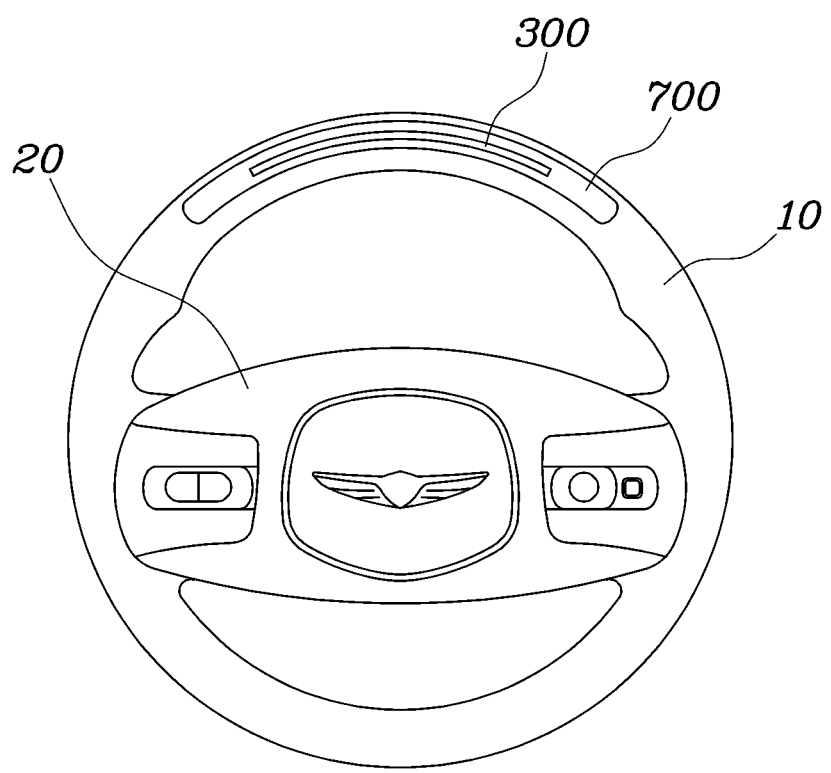
FIG. 1 is a view exemplarily illustrating a steering wheel in which a lighting device according to an exemplary embodiment of the present disclosure is mounted.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments included in the present specification will be described in detail with reference to the accompanying drawings. In the present specification, the same or similar components will be denoted by the same or similar reference numerals, and a repeated description thereof will be omitted.

In the following description, the expressions "module" and "portion" contained in terms of constituent elements to be described will be selected or used together in consideration only of the convenience of writing the following specification, and the expressions "module" and "portion" do not necessarily have different meanings or roles.

Detailed description of known technologies will be omitted if it is determined that the detailed description of the known technologies obscures the exemplary embodiments of the present disclosure. Furthermore, the accompanying drawings are merely intended to easily describe the exemplary embodiments of the present disclosure, but the spirit and technical scope of the present disclosure is not limited by the accompanying drawings. It should be understood that the present disclosure is not limited to specific disclosed exemplary embodiments of the present disclosure, but includes all modifications, equivalents and substitutes included within the spirit and technical scope of the present disclosure.

Terms including ordinals such as "first" or "second" used herein may be used to describe various elements, but the elements are not limited by the terms. The terms are only used for distinguishing one element from another element.

When a component is referred to as being "connected" or "contacted" to another component, it should be understood that it may be directly connected or contacted to the other component, but other components may exist therebetween. On the other hand, when a component is referred to as being "directly connected" or "directly contacted" to another component, it should be understood that there is no other component therebetween.

Singular expressions include plural expressions unless the context clearly indicates otherwise.

It is to be understood that terms such as "including", "having", etc. are intended to indicate the existence of the features, numbers, steps, actions, elements, components, or combinations thereof included in the specification, and are not intended to preclude the possibility that one or more other features, numbers, steps, actions, elements, components, or combinations thereof may exist or may be added.

A lighting device of a steering wheel according to an exemplary embodiment of the present disclosure includes: a grip body 100 forming a rim 10 of the steering wheel and including a body groove portion 110 formed in a shape in which the body groove portion 110 is cut away along the rim 10; a bezel 200 fitted to the body groove portion 110 and assembled to the grip body 100 so that the body groove portion 110 is covered, the bezel 200 including a center portion provided with a light transmission hole 210 that has a hollow shape; and a light emitting body 300 assembled to the bezel 200 so that the light emitting body 300 overlaps the light transmission hole 210 from between the body groove portion 110 and the bezel 200, the light emitting body 300 being configured to emit light through the light transmission hole 210.

Figure 2:
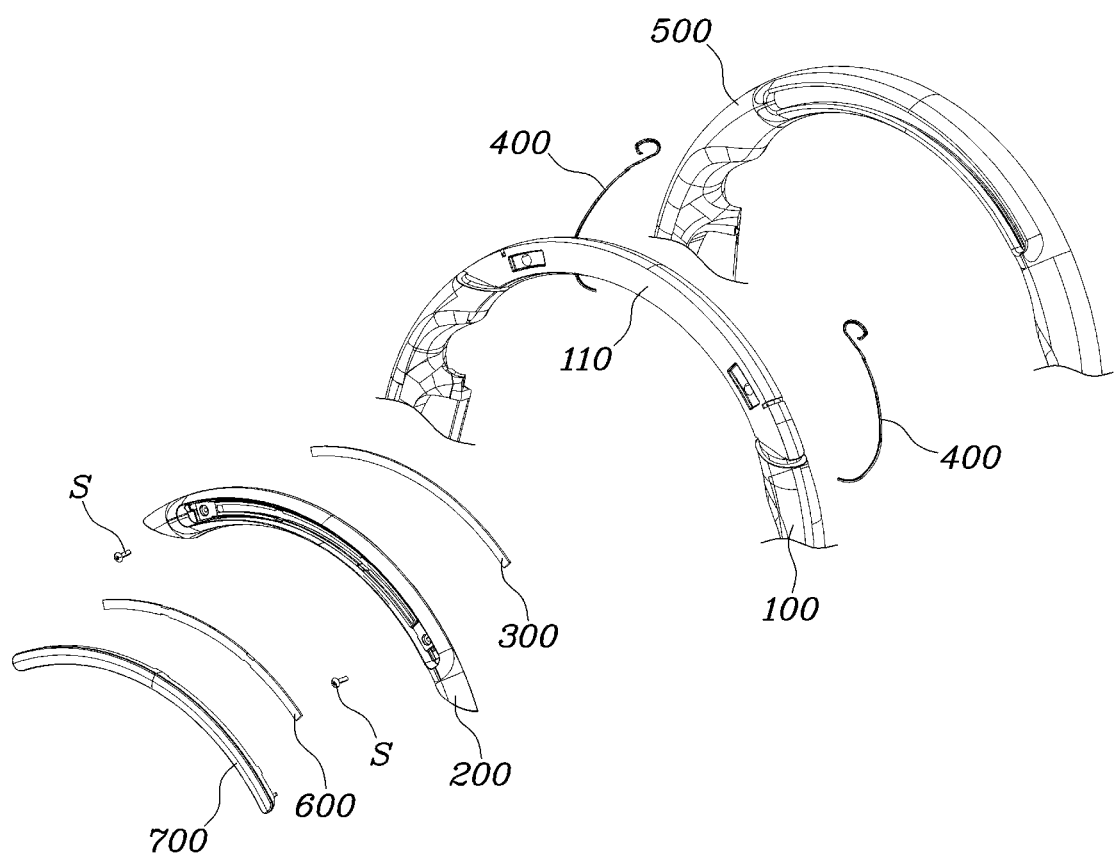
FIG. 2 is a view separating and illustrating components of the lighting device according to an exemplary embodiment of the present disclosure.

Referring to FIG. 1 and FIG. 2, the steering wheel has the rim 10 which may be held by a driver, and has a spoke 20 connected between the rim 10 and a steering shaft.

In an internal portion of the rim 10, an armature core 100a formed of a metal material forms a framework. Furthermore, in the rim 10, the grip body 100 formed of a resin material is formed in a shape covering the armature core 100a, and a wheel cover 500 that will be described later is formed in a shape covering the grip body 100.

Furthermore, on an upper end portion of the grip body 100, the body groove portion 110 is formed in a shape in which a front surface of the body groove portion 110 is cut away along a circumferential direction of the grip body 100, so that the body groove portion 110 is formed in an arc shape.

Furthermore, the bezel 200 is formed in an arc shape that corresponds to the shape of the body groove portion 110, and a rear surface border of the bezel 200 is assembled to match a border of the body groove portion 110, so that the bezel 200 is assembled in a shape matched to the body groove portion 110.

Furthermore, the bezel 200 is integrally formed, and the center portion of the bezel 200 has the light transmission hole 210 which is hollowed forwards and backwards along the arc shape of the bezel 200.

Furthermore, the light emitting body 300 is formed in an arc shape that corresponds to the shape of the light transmission hole 210, and the light emitting body 300 is assembled in a shape covering the light transmission hole 210 on a rear surface of the bezel 200, so that the bezel 200 to which the light emitting body 300 is assembled is assembled to the body groove portion 110. Therefore, because light emitted from the light emitting body 300 passes through the light transmission hole 210 and is emitted in front of the steering wheel, driving information of the vehicle is transmitted to the driver by use of light emitted from the lighting device.

In the present manner, in an exemplary embodiment of the present disclosure, the light transmission hole 210 is formed in the bezel 200, and the light emitting body 300 is assembled between the bezel 200 and the grip body 100, forming the lighting device. Accordingly, because an assembly structure of the lighting device which is assembled to the steering wheel is simplified, an assembly process and a mass productivity of an indicator based on the lighting device are improved.

Figure 3:
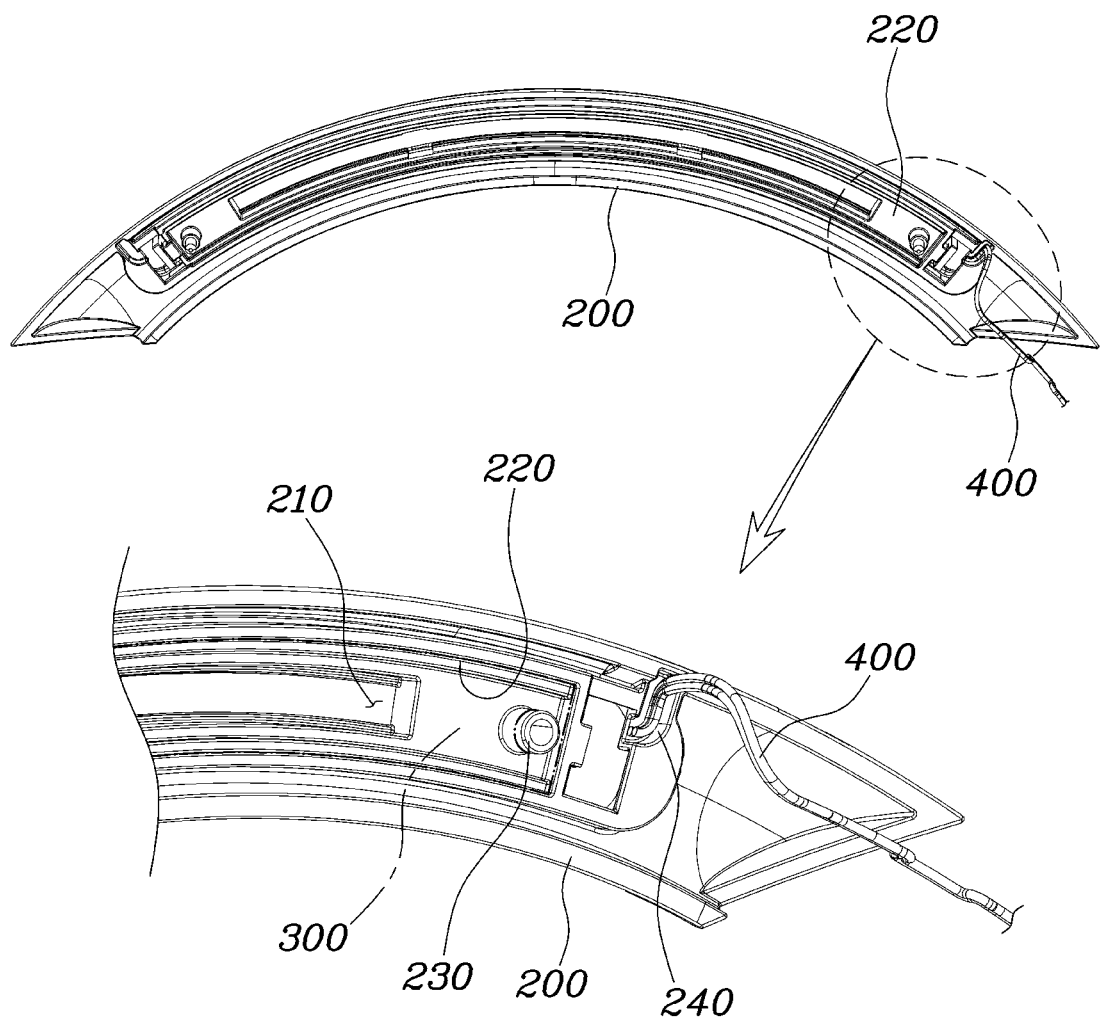
FIG. 3 is a view exemplarily illustrating a shape in which a light emitting body according to an exemplary embodiment of the present disclosure is assembled to a rear surface of the bezel.

Furthermore, referring to FIG. 3, a light emitting body assembling groove 220 which forms a border of the light transmission hole 210 and which has a shape corresponding to the shape of the light emitting body 300 is formed in the rear surface of the bezel 200, and the light emitting body 300 may be fitted and assembled to the light emitting assembling groove 220.

For example, the light emitting body assembling groove 220 including an arc shape is formed in a center portion of the rear surface of the bezel 200, and the light transmission hole 210 including the arc shape is formed in the light emitting body assembling groove 220 with a smaller area than an area of the light emitting body assembling groove 220.

Furthermore, an internal surface border of the light emitting body assembling groove 220 and an external surface border of the light emitting body 300 are formed to have a same size as each other.

Therefore, as the light emitting body 300 is fitted in the light emitting body assembling groove 220, the light emitting body 300 is temporarily assembled to the bezel 200.

Furthermore, an assembly guide protrusion 230 and an assembly guide groove 120 are respectively formed in the light emitting body assembling groove 220 and the body groove portion 110 that faces the light emitting body assembling groove 220, and the assembly guide protrusion 230 is fitted to the assembly guide groove 120. Furthermore, a fastener S passes through and is coupled to the assembly guide protrusion 230 and the assembly guide groove 120, so that the bezel 200 and the grip body 100 may be coupled to each other.

Figure 4:
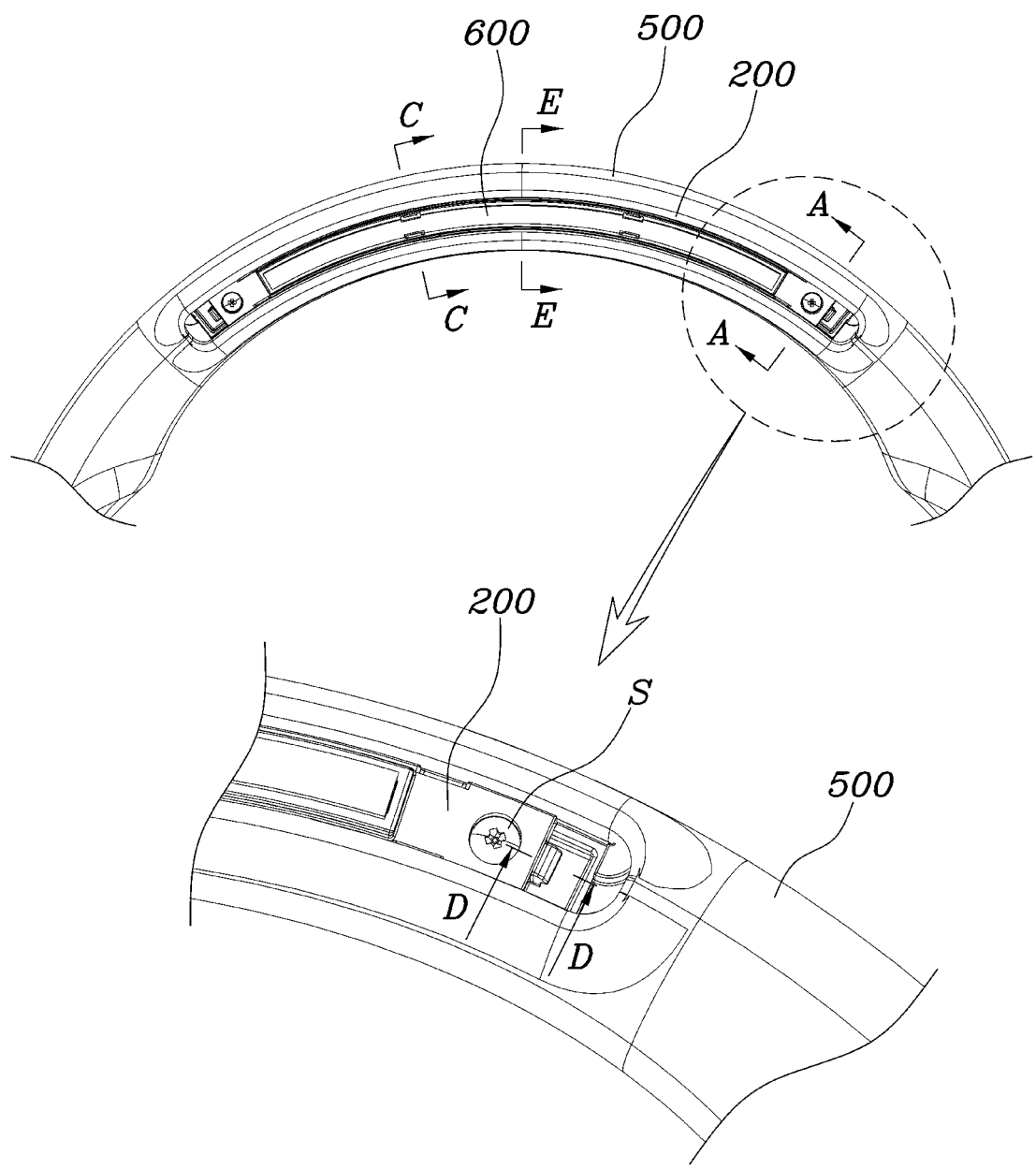
FIG. 4 is a view exemplarily illustrating a state in which the bezel and a grip body are coupled to each other by screws.
Figure 5:
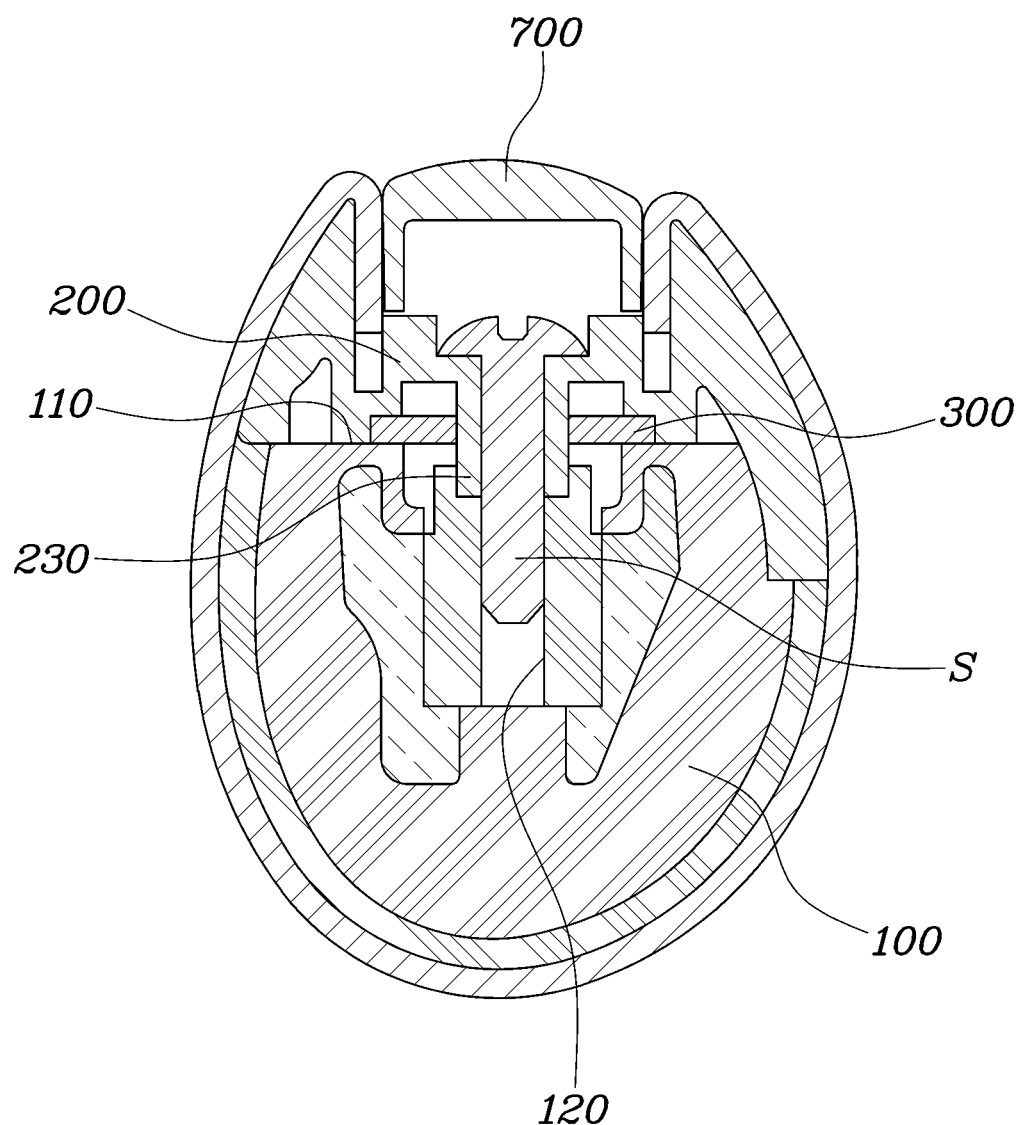
FIG. 5 is a cross-sectional view taken along line A-A in FIG. 4.

In describing the present disclosure in detail with reference to FIG. 4 and FIG. 5, the assembly guide protrusions 230 protrude from opposite sides of the internal surface of the light emitting body assembling groove 220 that faces the body groove portion 110, and the assembly guide grooves 120 are formed in opposite sides of the front surface of the body groove portion 110 corresponding to the assembly guide protrusions 230.

At the present time, the assembly guide groove 120 is formed so that the assembly guide groove 120 has an internal diameter corresponding to an external diameter of the assembly guide protrusion 230, so that the assembly guide protrusion 230 is securely inserted into the assembly guide groove 120.

Furthermore, the fastener S may be a screw or a bolt. Furthermore, as the fastener S passes through the assembly guide protrusion 230 and the fastener S is fastened into the assembly guide groove 120 in a screw structure, the bezel 200 and the grip body 100 are easily coupled to each other and a coupling force between the bezel 200 and the grip body 100 is improved.

Meanwhile, the present disclosure includes a wire 400 electrically connected to the light emitting body 300, and a body wire groove 130 is formed in the external surface of the grip body 100, so that the wire 400 is configured for being inserted into the body wire groove 130.

Figure 6:
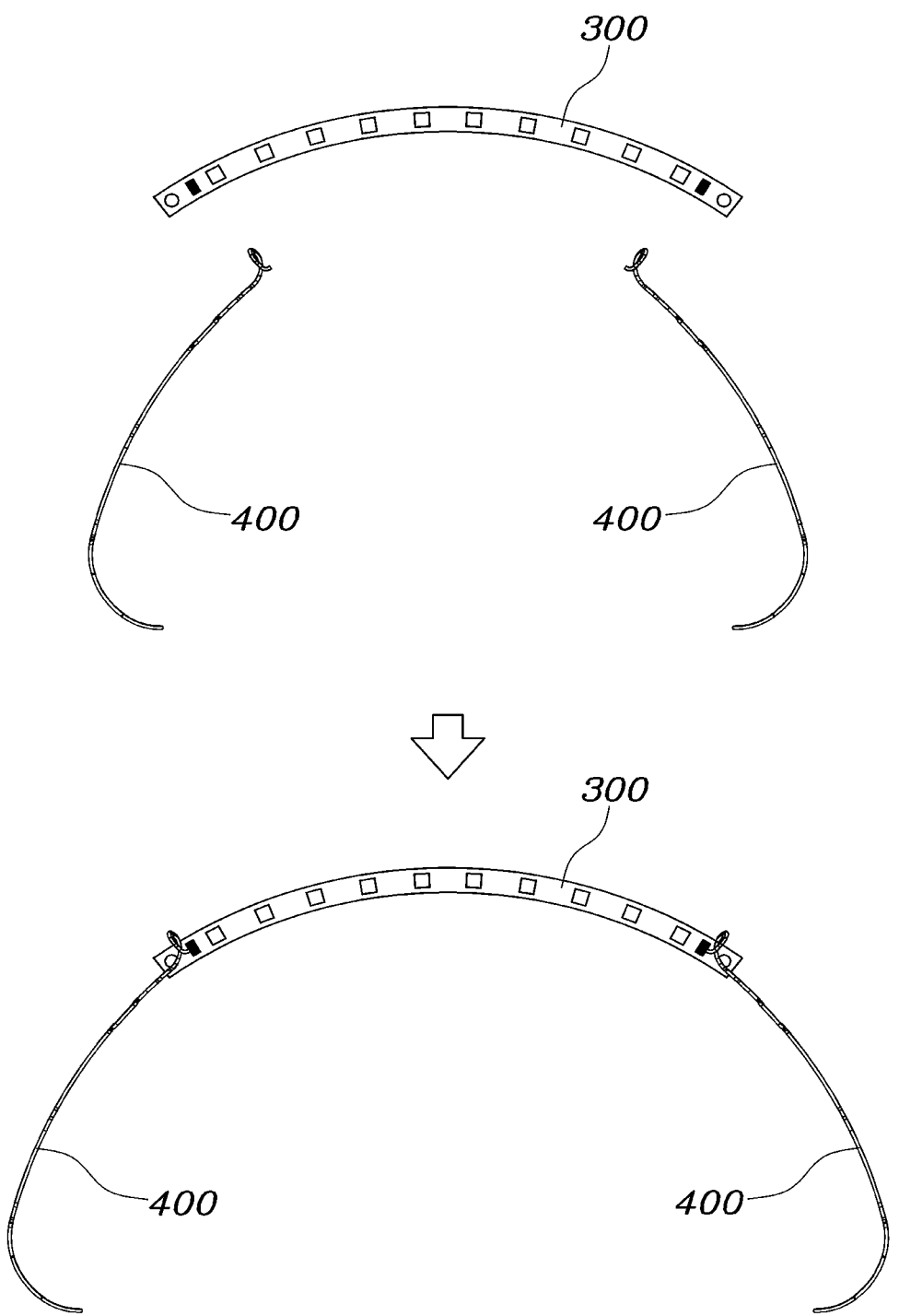
FIG. 6 is a view exemplarily illustrating a shape in which wires are coupled to the light emitting body according to an exemplary embodiment of the present disclosure.
Figure 7:
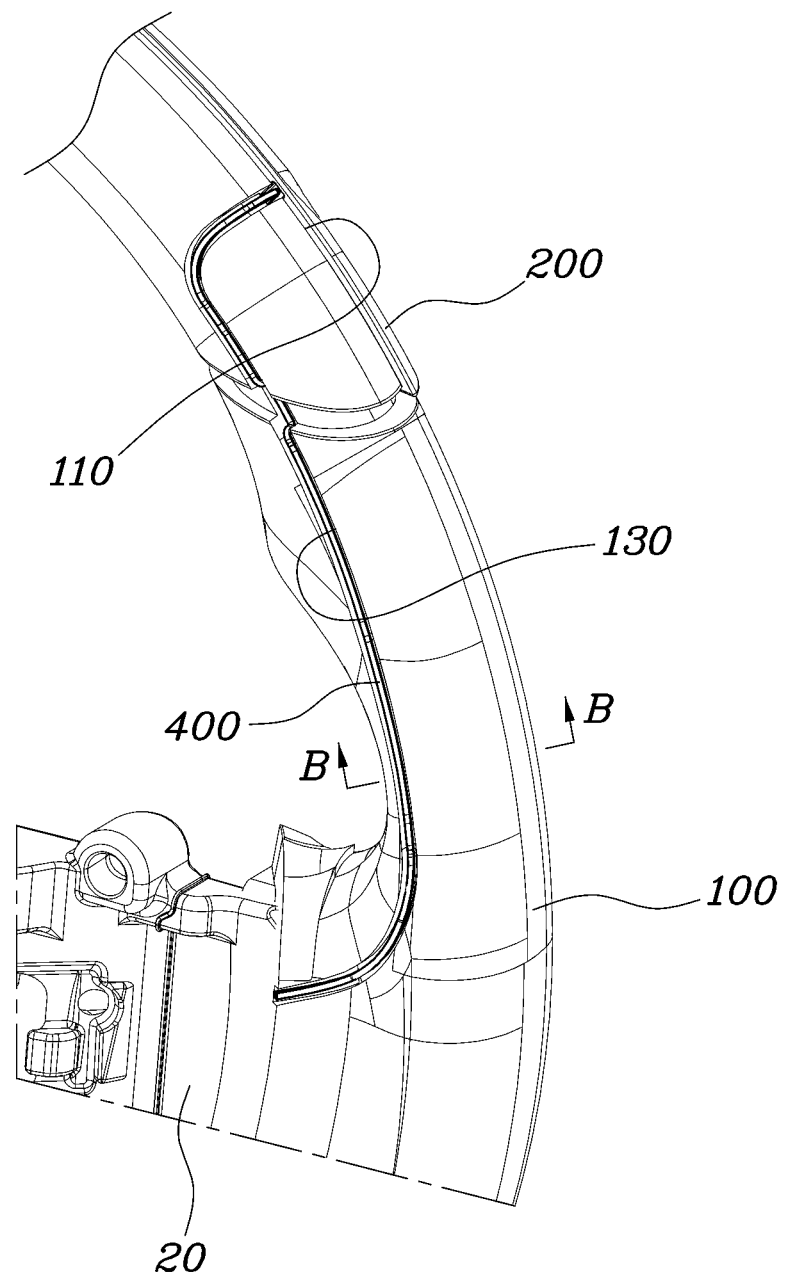
FIG. 7 is a view exemplarily illustrating a shape in which the wire is inserted into a body wire groove which is formed in the grip body according to an exemplary embodiment of the present disclosure.
Figure 8:
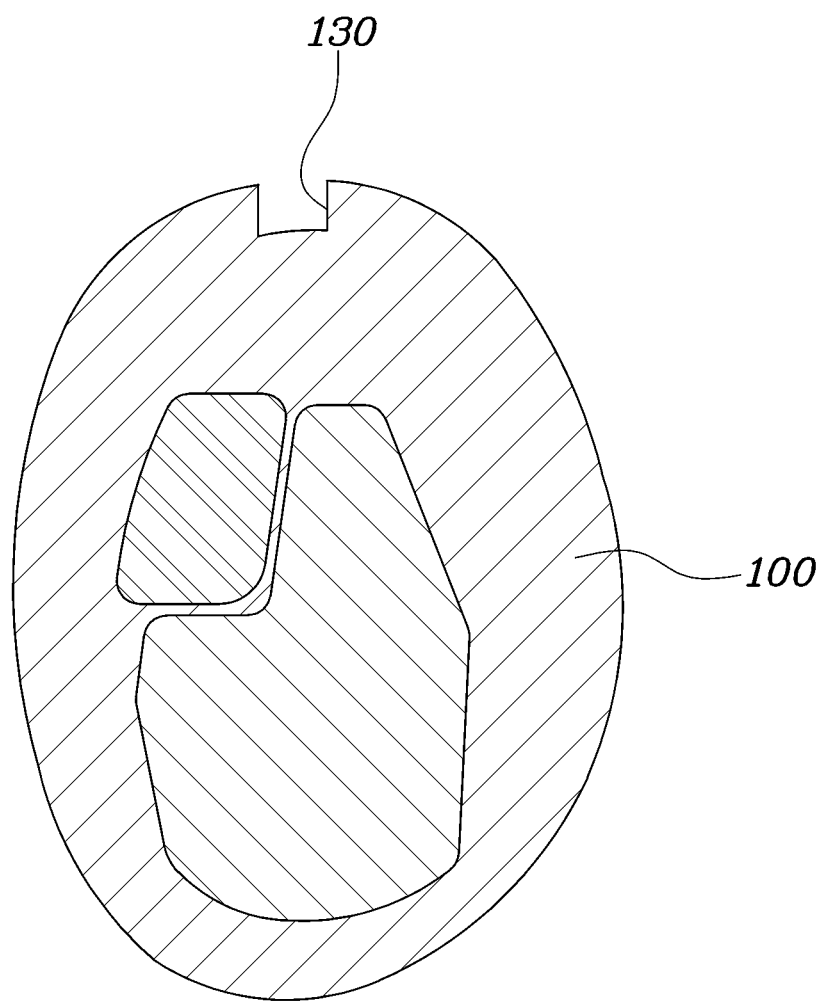
FIG. 8 is a cross-sectional view taken along line B-B in FIG. 7.

In describing the present disclosure with reference to FIGS. 6 to 8, the wires 400 are respectively connected to opposite end portions of the light emitting body 300.

Furthermore, because the body wire groove 130 including a cross-sectional area greater than a cross-sectional area of the wire 400 is formed in the external surface of the grip body 100, the bezel 200 is coupled to the grip body 100 while the wire 400 is inserted into the grip body 100.

That is, as the wire 400 is fixed to the grip body 100 by simply inserting the wire 400 into the body wire groove 130 only, an assembly process of the wire 400 is simplified, so that an the ease of assembly of a product is improved.

Furthermore, the body wire groove 130 may be formed so that the body wire groove 130 is connected from the front surface of the body groove portion 110 of the grip body 100 to the rear surface of the body groove portion 110 and is connected toward the spoke 20 of the steering wheel from the rear surface of the grip body 100.

That is, as the body wire groove 130 is formed to be connected to the body groove portion 110, the wire 400 is configured for being inserted into the body wire groove 130 without the wire 400 being caught between the bezel 200 and the body groove portion 110.

Furthermore, as the body wire groove 130 is formed along the rear surface of the grip body 100 in which the rear surface of the grip body 100 is relatively less accessible to the driver's hand, possibility of interference with the wire 400 during a steering operation of the steering wheel is reduced.

Furthermore, as illustrated in FIG. 3, a bezel wire groove 240 which is connected to the body wire groove 130 is formed in the rear surface of the bezel 200, so that the wire 400 is configured for being inserted into the bezel wire groove 240.

That is, in the body groove portion 110, as an end portion of the bezel wire groove 240 is connected to an end portion of the body wire groove 130 formed in the grip body 100, the wire 400 is configured for being stably aligned with the grip body 100 in the bezel 200 without twisting or jamming of the wire 400.

Furthermore, in an exemplary embodiment of the present disclosure, a wheel cover 500 may be formed on the grip body 100 so that the wheel cover 500 covers the body wire groove 130.

That is, as illustrated in FIGS. 2 to 12, in a state in which the wire 400 is inserted into the body wire groove 130, the wheel cover 500 covers the grip body 100, so that an unfamiliar gripping sensation caused by the wire 400 is reduced.

Furthermore, the wheel cover 500 includes: a pad layer 510 covering the external surface of the grip body 100 except for a portion to which the bezel 200 is assembled; and a covering layer 520 covering the pad layer 510 and together with the external surface of the bezel 200 except for a portion to which an external lens 700 is assembled.

For reference, the grip body 100 is molded with polyurethane foam.

That is, as the grip body 100 formed of a polyurethane material and the pad layer 510 cover the portion of the grip body 100 where the bezel 200 is not assembled, an excellent gripping sensation of the rim 10 may be realized. Furthermore, as the covering layer 520 formed of a material, such as leather, covers the portion of the rim 10 except for the external lens 700 and the portion where light of the light emitting layer 300 is emitted, an excellent gripping sensation and visibility of the light emitting body 300 may be improved and also an aesthetic effect of the steering wheel may be realized.

Meanwhile, the present disclosure may further include an internal lens 600 provided on the front surface of the bezel 200 to overlap the light transmission hole 210; and the external lens 700 including a shape covering the internal lens 600 and being coupled to the bezel 200, bringing the internal lens 600 into close contact with the front surface of the bezel 200.

That is, referring to FIGS. 2 to 12, the internal lens 600 is assembled to the front surface of the light transmission hole 210, and the external lens 700 is assembled to a front surface of the internal lens 600, so that light of the light emitting body 300 is dispersed through the internal lens 600 and the external lens 700 and is emitted through the light transmission hole 210.

As the external lens 700 is assembled to the bezel 200 while pushing the internal lens 600, the internal lens 600 is in close contact between the external lens 700 and the bezel 200.

Therefore, the internal lens 600 is prevented from being separated from the bezel 200 even if a structure in which the internal lens 600 is directly assembled to the bezel 200 is not provided, so that an assembly structure between components is simplified, increasing the ease of assembly.

Figure 9:
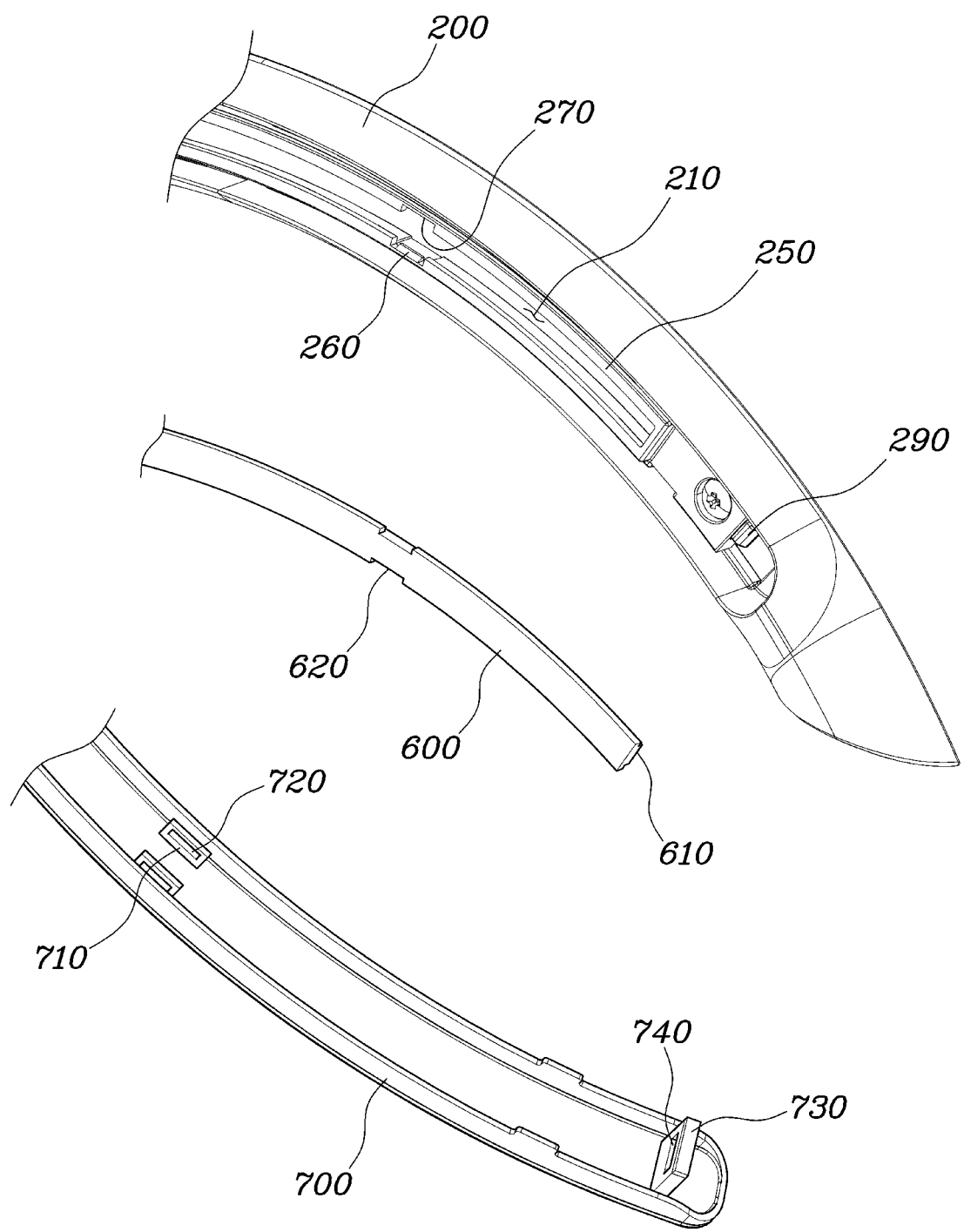
FIG. 9 is a view exemplarily illustrating a shape in which an internal lens is separated from the bezel according to an exemplary embodiment of the present disclosure.
Figure 12:
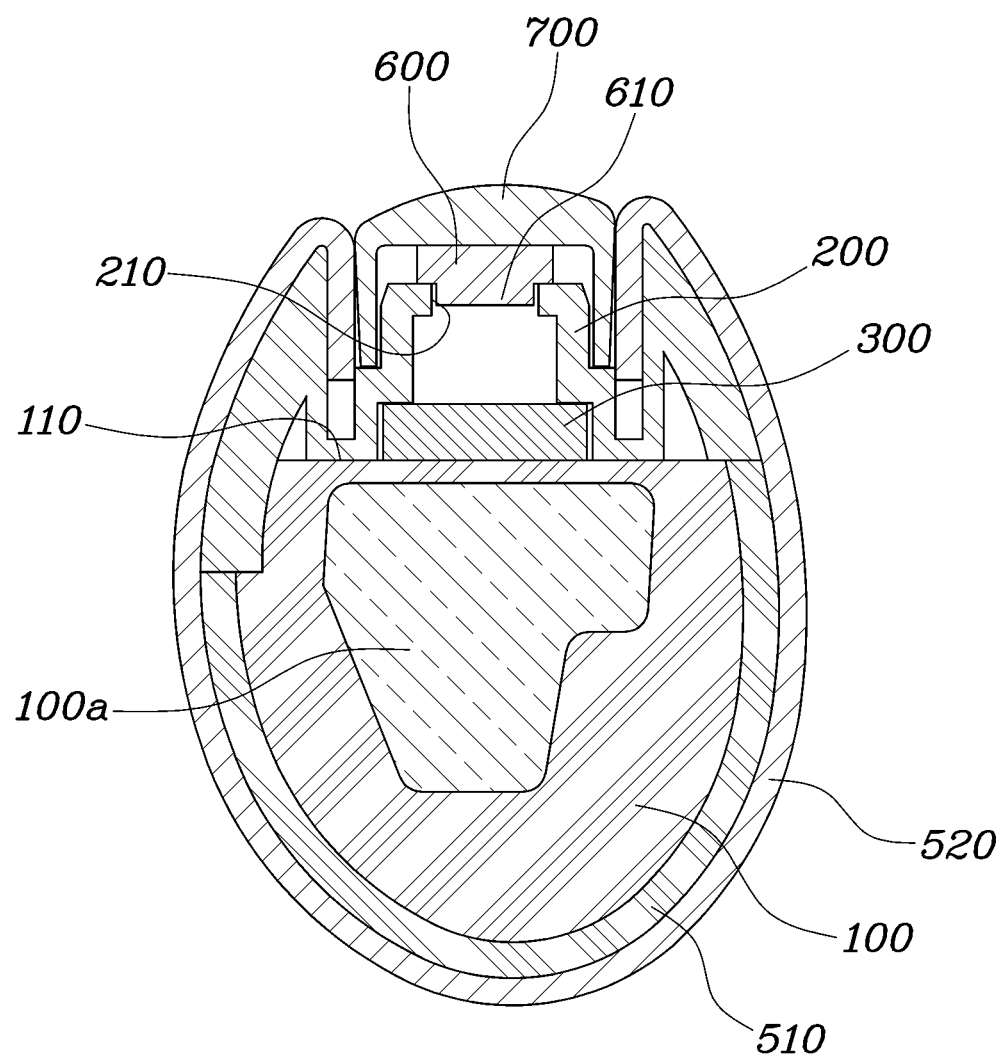
FIG. 12 is a cross-sectional view taken along line E-E in FIG. 12.

As illustrated in FIG. 9 and FIG. 12, a contact surface 250 forming a border of the light transmission hole 210 and including a shape corresponding to a shape of the internal lens 600 is formed on the front surface of the bezel 200, and a protrusion lens portion 610 including a shape corresponding to a shape of the light transmission hole 210 is formed on the rear surface of the internal lens 600, so that a border of the rear surface of the internal lens 600 is configured for being in close contact with the close contact surface 250 while the protrusion lens portion 610 is inserted into the light transmission hole 210.

That is, the border of the external surface of the protrusion lens portion 610 may formed to have the same size as the border of the internal surface of a front end portion of the light transmission hole 210 or is formed to have a size slightly smaller than the size of the border of the internal surface of the front end portion of the light transmission hole 210.

Accordingly, as the protrusion lens portion 610 is securely inserted into the light transmission hole 210, the border of the rear surface of the internal lens 600 connected to the protrusion lens portion 610 is configured for being in close contact with the border of the front surface of the light transmission hole 210.

Figure 10:
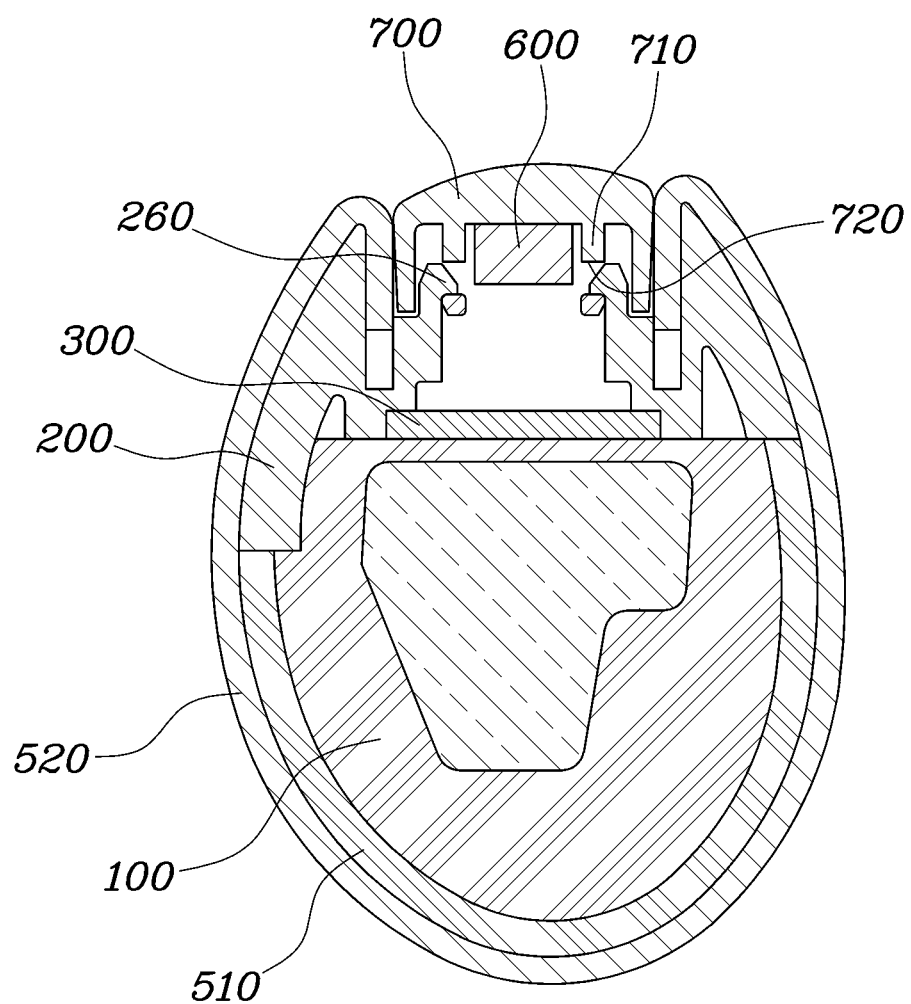
FIG. 10 is a cross-sectional view taken along line C-C in FIG. 4.
Figure 11:
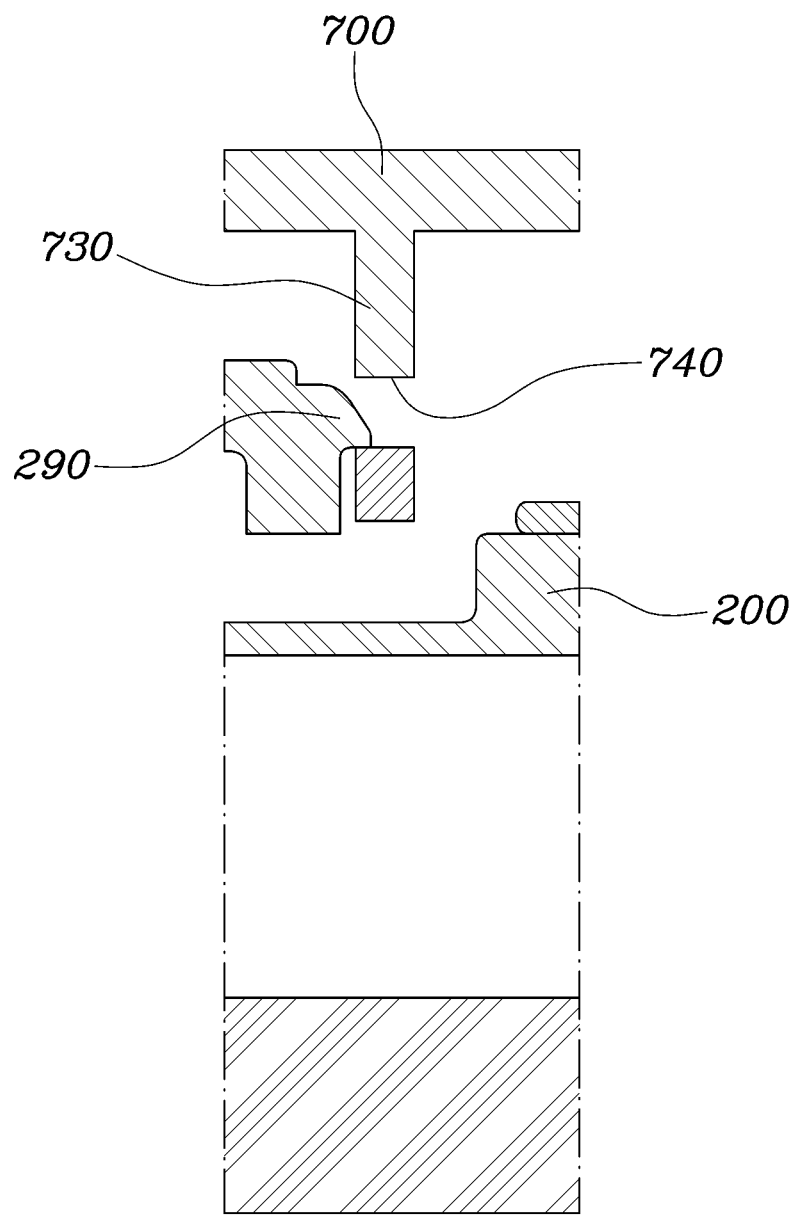
FIG. 11 is a cross-sectional view taken along line D-D in FIG. 4.

Meanwhile, as illustrated in FIG. 9 and FIG. 10, a subhooking protrusion 260 including an arrow shape is formed on an internal wall of the light transmission hole 210, and a subhooking hole 720 is formed in the rear surface of the external lens 700, so that the subhooking protrusion 260 is caught in the subhooking hole 720.

For example, a plurality of subhooking protrusions 260 is formed to be spaced from each other with a predetermined distance along the light transmission hole 210.

Furthermore, on the rear surface of the external lens 700, the subhooking holes 720 including square shapes are respectively formed at positions corresponding to the subhooking protrusions 260.

Accordingly, as the subhooking protrusions 260 are caught in the subhooking holes 720, the external lens 700 is configured for being assembled to the bezel 200.

A bezel interference avoiding groove 270 is formed in a portion of the internal surface of the light transmission hole 210, and the subhooking protrusions 260 are formed in the bezel interference avoiding groove 270. A lens interference avoiding groove 620 is formed in a portion of the external surface of the internal lens 600, the portion corresponding to the bezel interference avoiding groove 270. A subhook groove portion 710 that protrudes toward the bezel 200 is formed on the rear surface of the external lens 700. Furthermore, as the subhooking hole 720 is formed in the subhook groove portion 710, the subhooking protrusion 260 is configured for being caught in the subhooking hole 720 while the subhook groove portion 710 is inserted into the lens interference avoiding groove 620 and the bezel interference avoiding groove 270.

To the present end, a length of the subhooking protrusion 260 in a left and right width direction is shorter than a length of the bezel interference avoiding groove 270 in the left and right width direction, and a length of the lens interference avoiding groove 620 in the left and right width direction and the length of the bezel interference avoiding groove 270 in the left and right width direction are equal to each other.

Furthermore, a length of the subhook groove portion 710 in the left and right width direction is shorter or equal to the length of the bezel interference avoiding groove 270 in the left and right width direction, and the length of the subhooking protrusion 260 in the left and right width direction is shorter or equal to a length of the subhooking hole 720 in the left and right width direction thereof.

Therefore, when the external lens 700 is assembled to the bezel 200, the subhook groove portion 710 is inserted into the lens interference avoiding groove 620 and the bezel interference avoiding groove 270, so that the subhooking hole 720 is configured for being caught in and assembled to the subhooking protrusion 260 without interfering with the internal lens 600 and the bezel 200.

Next, a lens assembling groove 280 including a shape corresponding to a shape of the external lens 700 is formed in the front surface of the bezel 200, a main hooking protrusion 290 including an arrow shape is formed in an internal wall of the lens assembling groove 280, and a main hooking hole 740 is formed in the rear surface of the external lens 700, so that the main hooking protrusion 290 is configured for being caught in the main hooking hole 740.

For example, the main hooking protrusions 290 are respectively formed on opposite sides of the lens assembling groove 280.

Accordingly, main hook groove portions 730 that protrude toward the bezel 200 are formed on opposite sides of the rear surface of the external lens 700, and the main hooking holes 740 are formed in the main hook groove portions 730.

Therefore, as the main hooking holes 740 are caught in the main hooking protrusions 290, left and right sides of the external lens 700 are configured for being assembled to left and right sides of the bezel 200.

Figure 13:
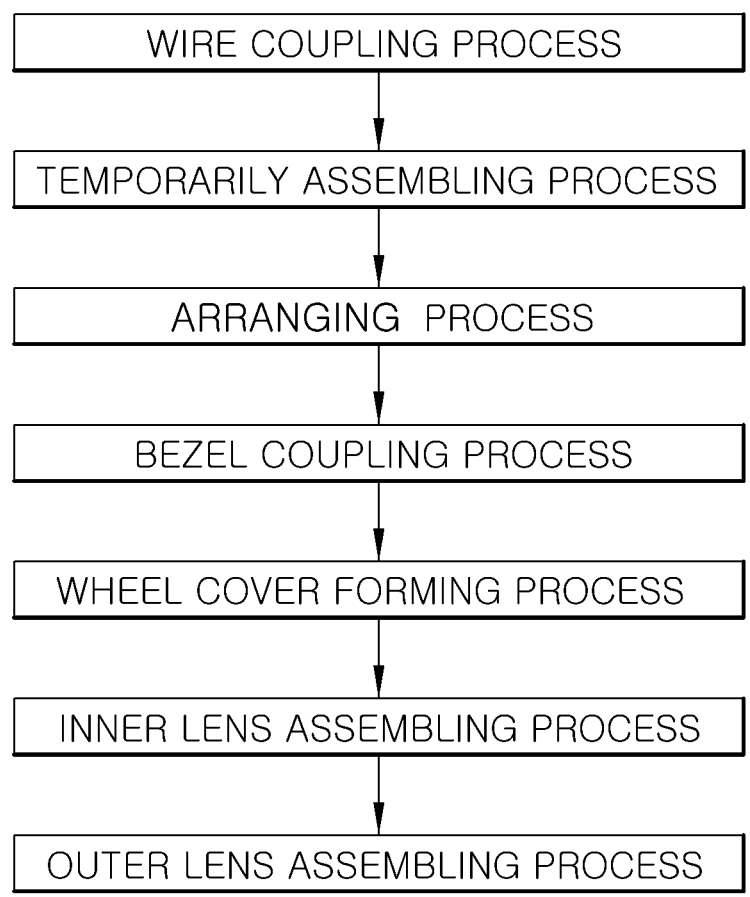
FIG. 13 is a flowchart sequentially arranging an assembling method of the lighting device of the steering wheel according to an exemplary embodiment of the present disclosure.

Meanwhile, as illustrated in FIG. 13, an assembling method of the lighting device of the steering wheel according to an exemplary embodiment of the present disclosure includes: a wire coupling process in which the wire 400 is coupled to the light emitting body 300; a temporarily assembling process in which the light emitting body 300 coupled to the wire 400 is temporarily assembled to the rear surface of the bezel 200; an arranging process in which the wire 400 is inserted and arranged into the body wire groove 130 which is formed in the grip body 100; a bezel coupling process in which the bezel 200 and the grip body 100 are coupled to each other by use of the fastener S; and a wheel cover forming process in which the wheel cover 500 is formed on the grip body 100 so that the wheel cover 500 covers the body wire groove 130.

Furthermore, after the wheel cover forming process is performed, the assembling method may further include: an internal lens assembling process in which the internal lens 600 is inserted into the light transmission hole 210 which is formed in the front surface of the bezel 200; and an external lens assembling process in which the external lens 700 is fastened to the bezel 200 by use of a coupling structure of hooking protrusions and hooking holes that are formed in the external lens 700 and the bezel 200.

Hereinafter, the order of assembling the lighting device to the steering wheel according to an exemplary embodiment of the present disclosure will be described.

First, the wires 400 are coupled to the opposite sides of the light emitting body 300.

Accordingly, the light emitting body 300 to which the wires 400 are coupled is temporarily assembled to the rear surface of the bezel 200. At the instant time, the wires 400 are inserted into the bezel wire groove 240.

Next, the wires 400 are inserted and aligned into the body wire grooves 130 that are formed in the grip body 100.

Accordingly, the assembly guide protrusion 230 formed on the bezel 200 is inserted into the assembly guide groove 120 formed in the grip body 100, and the assembly guide protrusion 230 and the assembly guide groove 120 are screw-fastened to each other by the screws, coupling the bezel 200 to the grip body 100.

Next, after covering the external surface of the grip body 100 with the pad layer 510 except for the portion where the bezel 200 is assembled, the covering layer 520 covers the pad layer 510 and together with the external surface of the bezel 200 except for the portion to which the external lens 700 is assembled.

After Accordingly, the internal lens 600 is inserted into the light transmission hole 210 on the front surface of the bezel 200.

Accordingly, the external lens 700 is fastened to the bezel 200 by use of the coupling structure of the hooking protrusions and the hooking holes that are formed in the external lens 700 and the bezel 200, completing assembling the lighting device to the steering wheel.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An assembling method of a lighting device of a steering wheel, the assembling method comprising:
   coupling a wire to a light emitting body;
   assembling the light emitting body coupled to the wire to a rear surface of a bezel for a predetermined time period;
   inserting and providing the wire into a body wire groove which is formed in a grip body;
   coupling the bezel and the grip body to each other by use of a fastener; and
   forming a wheel cover on the grip body so that the wheel cover covers the body wire groove,
   wherein, in the forming of the wheel cover on the grip body, after an external surface of the grip body is covered with a pad layer except for a portion to which the bezel is assembled, a covering layer covers the pad layer together with an external surface of the bezel except for a portion to which an external lens is assembled.

2. An assembling method of a lighting device of a steering wheel, the assembling method comprising:
   coupling a wire to a light emitting body;
   assembling the light emitting body coupled to the wire to a rear surface of a bezel for a predetermined time period;
   inserting and providing the wire into a body wire groove which is formed in a grip body;
   coupling the bezel and the grip body to each other by use of a fastener;
   forming a wheel cover on the grip body so that the wheel cover covers the body wire groove;
   after the forming of the wheel cover on the grip body, inserting an internal lens into a light transmission hole formed in a front surface of the bezel; and
   fastening an external lens to the bezel by use of a coupling structure of a hooking protrusion and a hooking hole that are formed in the external lens and the bezel.

* * * * *